US008452876B1

(12) United States Patent
Williams et al.

(10) Patent No.: US 8,452,876 B1
(45) Date of Patent: May 28, 2013

(54) GRAPHICAL CONFIGURATION INTERFACE FOR NETWORK POLICY

(75) Inventors: Brian Denny Williams, Mountain View, CA (US); Albert L. Papp, III, Mountain View, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 2018 days.

(21) Appl. No.: 11/515,625

(22) Filed: Sep. 5, 2006

(51) Int. Cl.
*G06F 15/16* (2006.01)
(52) U.S. Cl.
USPC .................. 709/227; 715/736; 370/230
(58) Field of Classification Search
USPC .. 709/200, 224, 226, 232, 242, 225; 455/423; 726/11; 370/230; 715/736
See application file for complete search history.

(56) References Cited

U.S. PATENT DOCUMENTS

| 6,477,572 | B1 * | 11/2002 | Elderton et al. | 709/224 |
|---|---|---|---|---|
| 6,484,261 | B1 * | 11/2002 | Wiegel | 726/11 |
| 6,816,903 | B1 * | 11/2004 | Rakoshitz et al. | 709/226 |
| 6,912,587 | B1 * | 6/2005 | O'Neil | 709/232 |
| 7,047,496 | B2 | 5/2006 | Nelles et al. | |
| 7,231,210 | B1 * | 6/2007 | Croak et al. | 455/423 |
| 7,272,625 | B1 * | 9/2007 | Hannel et al. | 709/200 |
| 7,409,447 | B1 * | 8/2008 | Assadzadeh | 709/225 |
| 2005/0138204 | A1 * | 6/2005 | Iyer et al. | 709/242 |
| 2006/0072456 | A1 * | 4/2006 | Chari et al. | 370/230 |

OTHER PUBLICATIONS

"ModelViewController page from the Portland Pattern Repository's Wiki, which page was last edited on Nov. 28, 2006". http://c2.com/cgi/wiki?ModelViewController.

* cited by examiner

*Primary Examiner* — Dustin Nguyen
(74) *Attorney, Agent, or Firm* — Baker Botts L.L.P.

(57) ABSTRACT

A graphical user interface for configuring policies which manage traffic over a computer network. An implementation of the invention disassociates the definition of traffic policies from their logical and physical application to the network and its constituent devices. One implementation allows a network manager to define traffic policies through user inputs such as dragging and dropping rule templates with a mouse. An implementation further allows such policies to be logically applied to parts and subparts of the computer network through the dragging and dropping of the policies and defined network endpoints. One implementation of the invention then provides multiple views of these policies as applied.

26 Claims, 15 Drawing Sheets

Applied Policies

GRAPHICAL CONFIGURATION INTERFACE FOR NETWORK POLICY

CROSS-REFERENCE TO RELATED APPLICATIONS

This application makes reference to the following commonly-owned U.S. patent applications and patents, whose disclosures are incorporated herein by reference in their entirety:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, now abandoned, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, now abandoned, in the name of Todd Krautkremer and Guy Riddle, entitled "Application Service Level Mediation and Method of Using the Same;"

U.S. patent application Ser. No. 09/966,538; now U.S. Pat. No. 7,406,522, in the name of Guy Riddle, entitled "Dynamic Partitioning of Network Resources;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 10/015,826, now U.S. Pat. No. 7,013,342, in the name of Guy Riddle, entitled "Dynamic Tunnel Probing in a Communications Network;"

U.S. patent application Ser. No. 10/039,992, now U.S. Pat. No. 7,032,072, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, now abandoned, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, now abandoned, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, now U.S. Pat. No. 7,433,304, in the name of Brett Galloway and George Powers, entitled "Classification Data Structure enabling Multi-Dimensional Network Traffic Classification and Control Schemes;"

U.S. patent application Ser. No. 10/334,467, now U.S. Pat. No. 7,292,531, in the name of Mark Hill, entitled "Methods, Apparatuses and Systems Facilitating Analysis of the Performance of Network Traffic Classification Configurations;"

U.S. patent application Ser. No. 10/453,345, now abandoned, in the name of Scott Hankins, Michael R. Morford, and Michael J. Quinn, entitled "Flow-Based Packet Capture;"

U.S. patent application Ser. No. 10/676,383, now U.S. Pat. No. 7,385,924, in the name of Guy Riddle, entitled "Enhanced Flow Data Records Including Traffic Type Data;"

U.S. patent application Ser. No. 10/720,329, now U.S. Pat. No. 7,664,048, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198, now U.S. Pat. No. 7,496,661, in the name of Michael Robert Morford and Robert E. Purvy, entitled "Adaptive, Application-Aware Selection of Differentiated Network Services;"

U.S. patent application Ser. No. 10/843,185, now U.S. Pat. No. 7,376,080, in the name of Guy Riddle, Curtis Vance Bradford and Maddie Cheng, entitled "Packet Load Shedding;"

U.S. patent application Ser. No. 10/938,435, now U.S. Pat. No. 7,545,748, in the name of Guy Riddle, entitled "Classification and Management of Network Traffic Based on Attributes Orthogonal to Explicit Packet Attributes;"

U.S. patent application Ser. No. 11/027,744, now U.S. Pat. No. 7,822,837, in the name of Mark Urban, entitled "Adaptive Correlation of Service Level Agreement and Network Application Performance;" and U.S. patent application Ser. No. 11/082,638, now U.S. Pat. No. 7,420,992, in the name of Li Fang and Mary L. Laier, entitled "Adaptive Network Traffic Compression Mechanism Including Dynamic Selection of Compression Algorithms."

TECHNICAL FIELD

The present invention generally relates to computer networks and, more particularly, to network policy configuration interfaces and tools.

The present invention relates to a graphical interface for the configuration of policies which manage or shape traffic over a network. By way of example, the graphical interface might be a graphical user interface (GUI) in a computer system which takes user input from a keypad and/or a mouse. Also, by way of example, the network might be a wide-area network (WAN) of computers, as described in the cross-references above.

The general design of a GUI involves a model in which data is stored and processed, a view which allows the user to enter and view data, and a controller which synchronizes the model and the view. This general design is sometimes referred to as the model-view-controller (MVC) design pattern.

BACKGROUND

Organizations are growing increasingly dependent on distributed computing environments and networks, including WANs, to accomplish critical tasks. As the number of users, the number of applications, and the extent of external traffic increases, congestion forms in organizational networks, impairing the performance of applications important to the organization. Network managers are constantly challenged with monitoring and controlling factors such as the rate, volume, origin, destination, and nature of network traffic (e.g., the application creating traffic), in order to align available network resources with organizational priorities.

In order to understand the context of certain embodiments of the invention, the following provides an explanation of certain technical aspects of a packet based telecommunications network environment. Internet/Intranet technology is based largely on the TCP/IP protocol suite. At the network level, IP provides a "datagram" delivery service—that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a window which by its sliding operation essentially limits the amount of unacknowledged transmit data that a transmitter is allowed to emit. Another flow control mechanism is a congestion window, which is a refinement of the sliding window scheme involving a conservative expansion to make use of the full, allowable window. A component of this mechanism is sometimes referred to as "slow start."

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a WAN link. They can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a variety of business functionality. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. Bandwidth management devices allow network administrators to specify policies operative to control and/or prioritize the bandwidth allocated to individual data flows according to traffic classifications. In addition, certain bandwidth management devices allow network administrators to divide available bandwidth into partitions. These partitions ensure a minimum bandwidth and/or cap bandwidth as to a particular class of traffic. An administrator specifies a traffic class (such as FTP data, or data flows involving a specific user) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (protecting and/or capping bandwidth for a particular user).

Confirmation of bandwidth management devices, however, can become quite complicated for large or complex networks that generate a massive number of data flows associated with a wide variety of traffic classes all competing for bandwidth. Alignment of network policy configuration with organizational priorities thus involves the configuring of policies that manage or shape network traffic with respect fo the factors described above. For example, a policy might set a limit on the rate of a particular type of traffic, e.g., outbound traffic to the Internet is limited to 10% of total traffic over a WAN. In the related literature, this is called a bandwidth quota. Or a policy might completely ban a particular type of traffic over the WAN altogether, e.g., traffic involving an application which permit peer-to-peer (P2P) file-sharing. An example of such an application would be the Grokster application described in *MGM Studios, Inc.* v. *Grokster, Ltd.*, 545 U.S. 913; 125 S. Ct. 2764; 162 L. Ed. 2d 781 (2005).

In the related art, GUIs for the configuring of traffic policy tend to be rigidly hierarchical with respect to the above factors and therefore require numerous redundant data entries, especially when applied to networks having multiple sites. For example, to add a policy using such a GUI to the multiple sites of a network, a network manager typically needed to enter the policy duplicative for each affected site.

SUMMARY OF THE INVENTION

The present invention provides methods, apparatuses, and systems directed to a graphical interface that facilitates configuration of network policy, such as policies which manage or shape traffic in a network. The present invention, in one implementation, aggregates all commonalities with respect to an individual policy and allows it to be applied, both logically and physically, to multiple sites in a network. All subsequent changes to an individual policy can be reapplied, both logically and physically, to multiple sites in a network.

This aggregation is possible because the present invention disassociates the creation and definition of policies from their application to a network and its constituent devices. This disassociation allows the same policy to be applied to parts and sub-parts of a network, thus eliminating the need for both duplicative policy definition and duplicative policy application.

The present invention further facilitates the configuration of policy managing or shaping network traffic by providing multiple graphical views of the key data items which go into a such a policy, including: the rules that make up the policy itself, the endpoints (origin and destination) of particular network traffic, the sites and WAN links representing physical connections in a network, and the applications creating particular network traffic.

In one embodiment, the present invention is a GUI facilitating configuration of network policy, such as policies managing or shaping traffic in a WAN. However, the present invention lends itself to myriad other embodiments involving other forms of network devices, such as firewalls, packet capture devices, gateways, proxies, etc., and involving networks of all types, including, by way of example, other computer networks, telephone networks, electrical networks, and cable networks.

DESCRIPTION OF EXAMPLE EMBODIMENT(S)

The following example embodiments and their aspects are described and illustrated in conjunction with methods, apparatuses, and systems which are meant to be exemplary and illustrative, not limiting in scope.

Network Context

Figure 1:
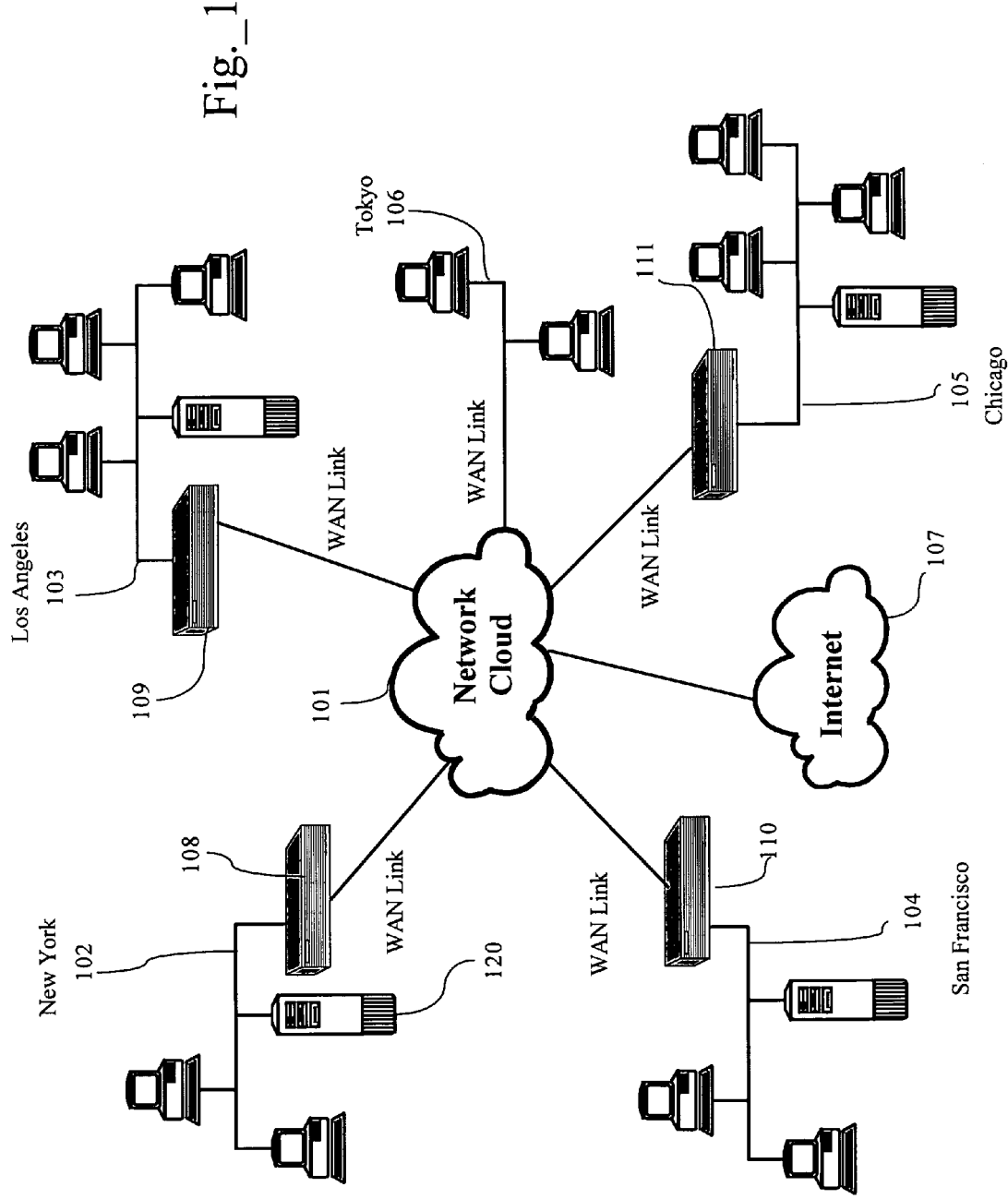
FIG. 1 is a diagram illustrating a network environment in which an embodiment of the present invention might operate.
Figure 6:
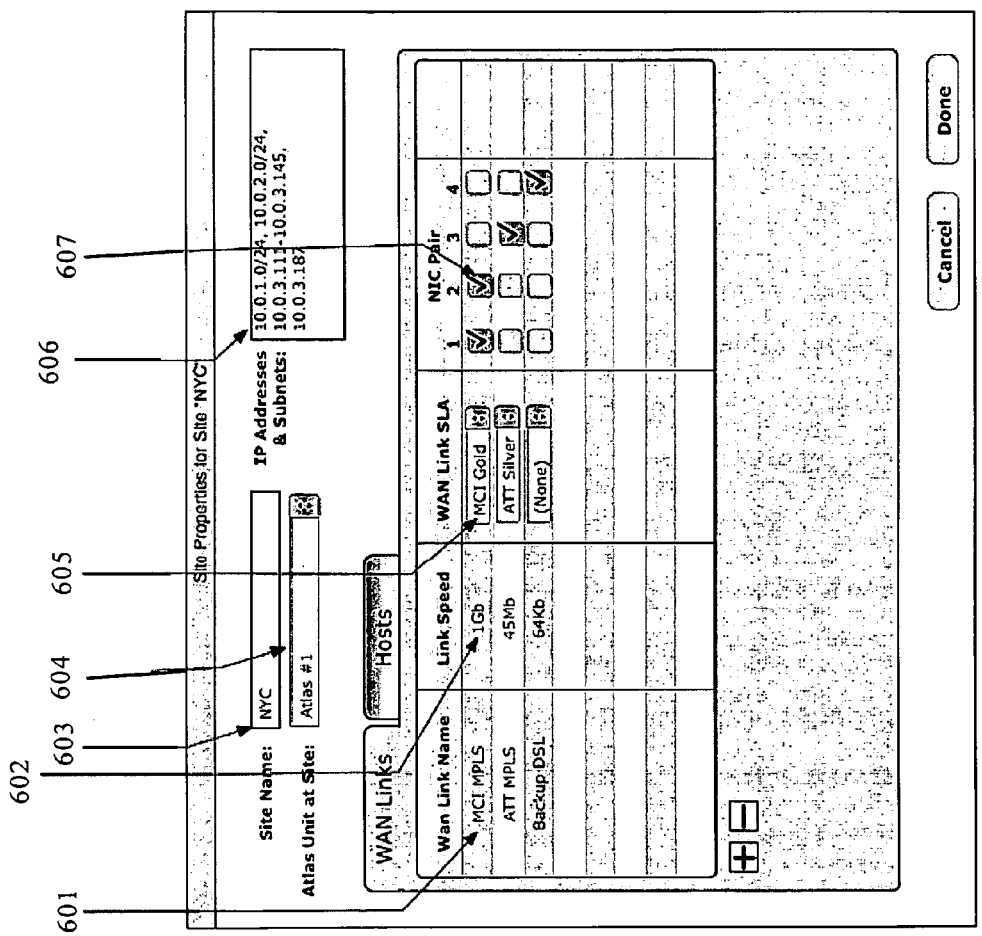
FIG. 6 is a diagram showing an example of a GUI component for creating a logical site using WAN links, which component might be a part of an embodiment of the present invention.

FIG. 1 shows an abstract network environment which includes a network cloud 101 (e.g., an MPLS (Multi-protocol Label Switching) cloud, a DiffServ (Differentiated Services) cloud, etc.), a New York site 102, a Los Angeles site 103, a San Francisco site 104, a Chicago site 105, a Tokyo site 106, and a connection to the Internet 107. WAN links connect all of the sites to the network cloud 101, though devices for managing or shaping network traffic, 108, 109, 110, and 111, only operate on the WAN links connecting sites 102, 103, 104, and 105 to the network cloud 101. Devices, such as 108, 109, 110, and 111 are described in detail in the cross-references above. Other network topologies are possible. For example, one or more of the sites may include multiple WAN links. Or a network device may be deployed for each WAN link. Or one or more of the WAN links may not include a network device. Still further, a single network device may have more than one WAN link passing through it, as illustrated by FIG. 6. Alternatively, the network traffic of one WAN link may be transmitted using one or more bonded network interfaces, such as an Ethernet NIC (Network Interface Card).

In one implementation, the configuration interfaces and policy deployment functionality described herein is provided by a network policy configuration application hosted on a network policy configuration server 120 in FIG. 1. In one implementation, the network policy configuration application can be a stand-alone application, or part of a network management application or system. In one implementation, network policy configuration server 120 can be located at one of the sites 102, 103, 104, and 105. However, the location of network policy configuration server 120 can vary considerably without departing from the scope of the invention. In one implementation, the functionality of network policy configuration server 120 can be hosted by a WAN or other network service provider. In one implementation, network policy configuration server can include HTTP or other communications functionality, allowing a network administrator to access the server via a browser or other communications application. In another implementation, the functionality described herein can be a software application installed on a PC or other computing platform.

Figure 2:
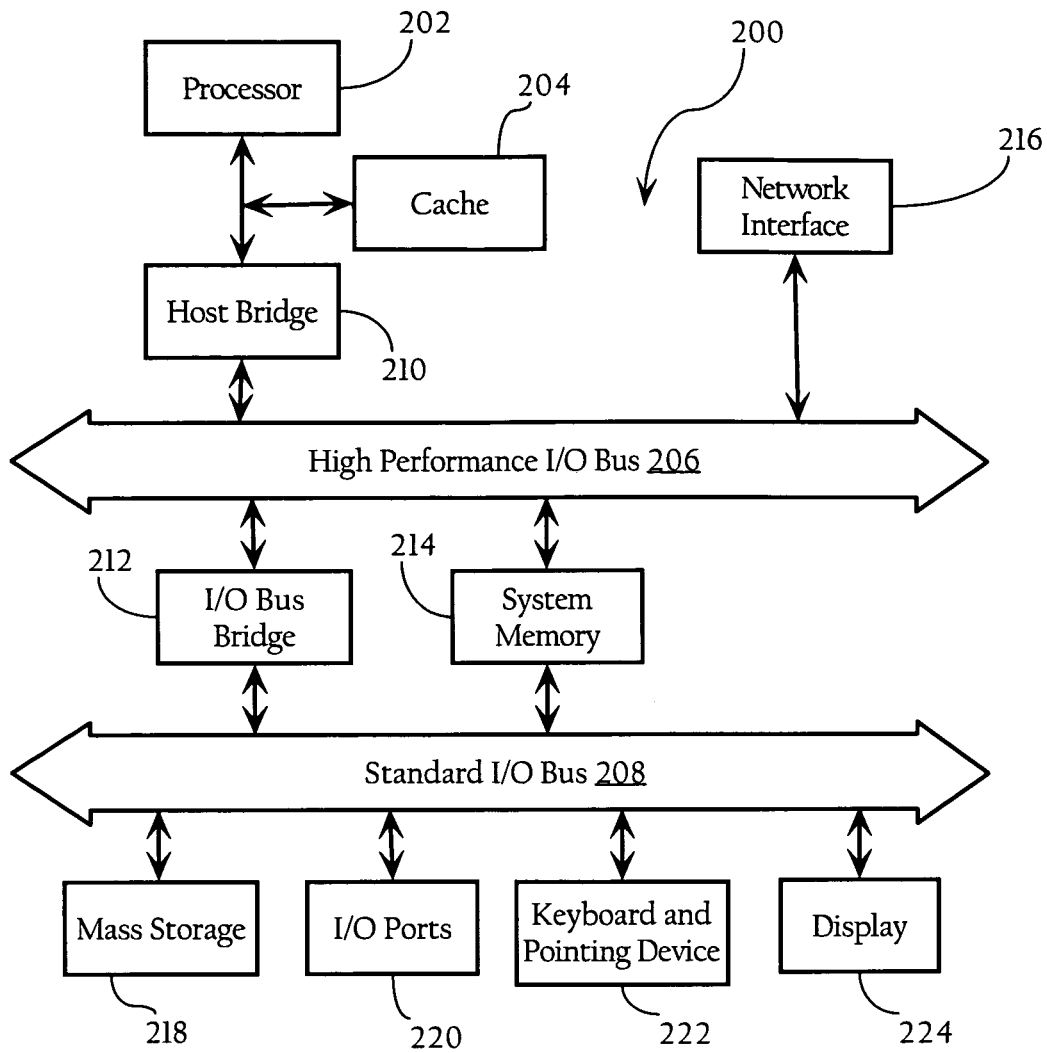
FIG. 2 is a diagram showing the system architecture for a network policy configuration server, which might be used by an embodiment of the present invention.

FIG. 2 illustrates, for didactic purposes, a hardware system 200, which may be used to implement a network policy configuration server 120 operative to construct and present the graphical user interfaces described herein, as well as processing a policy configuration set for deployment to one or more network devices. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one implementation, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of the network policy configuration application described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, California, UNIX operating systems, LINUX operating systems, and the like.

Policies, Endpoints, and Sites

Devices, such as 108, 109, 110, and 111, manage or shape network traffic in their respective WANs using rules. A rule is defined by an action to be applied to particular network traffic and criteria for matching that traffic. Thus a rule is a representation of an available control for particular traffic on a network.

A policy is a named collection of rules. In one implementation, a policy is created independent of any reference to endpoints on the managed network and is only later associated with a description of the traffic to which the policy applies. This procedure allows a single policy definition to apply to several different network locations or descriptions of traffic.

Figure 3:
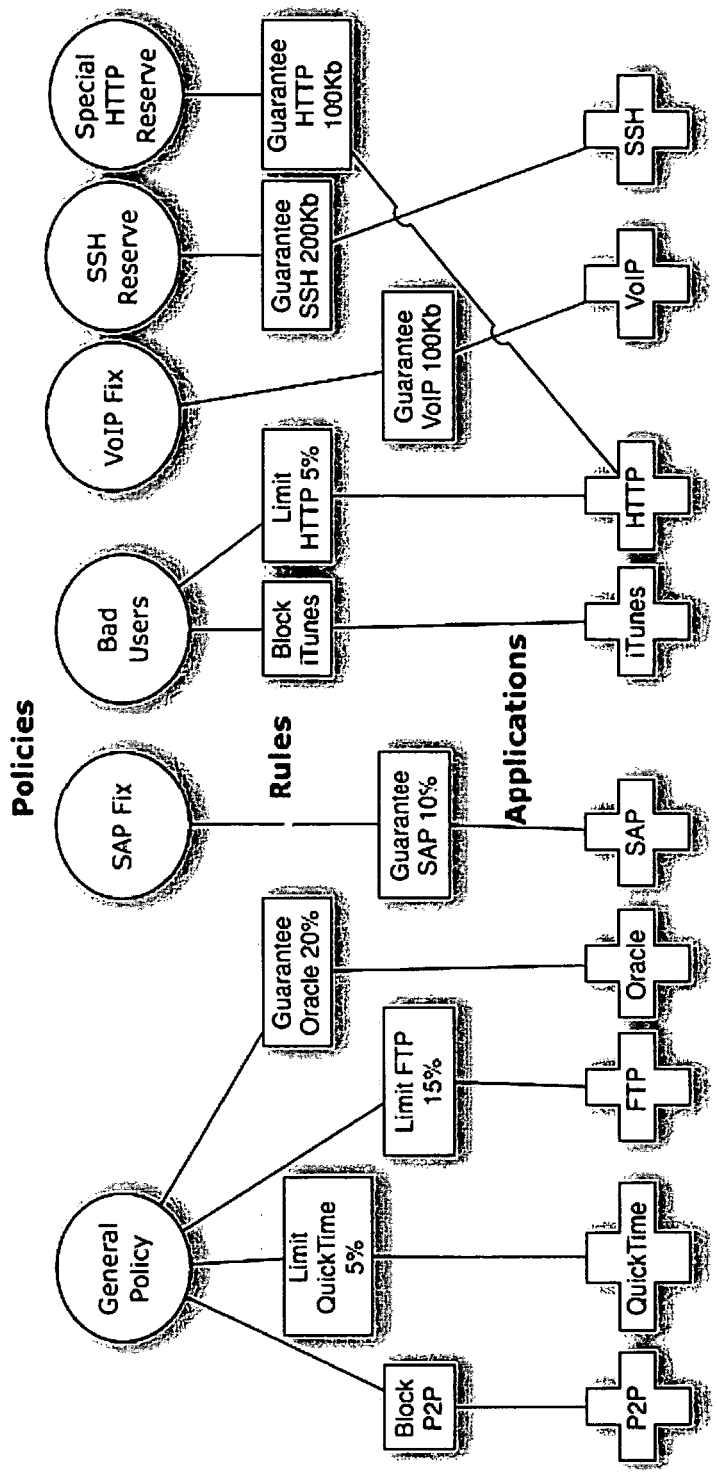
FIG. 3 is a diagram showing several examples of a possible policy for managing or shaping traffic over a WAN, which policies might be created with an embodiment of the present invention.

FIG. 3 shows several examples of policies that might be used by devices such as 108, 109, 110, and 111. As FIG. 3 makes clear, a policy might consist of several rules or merely one rule. Further, a rule typically tends to affect an application, which in this embodiment's context, is an application program, such as SAP, or a collection of application programs, such as P2P. In one implementation, the rules defining a policy may include one or more attributes of network traffic, such as network application types, protocol types, ets., and one or more operations to be applied to matching network traffic.

Figure 4:
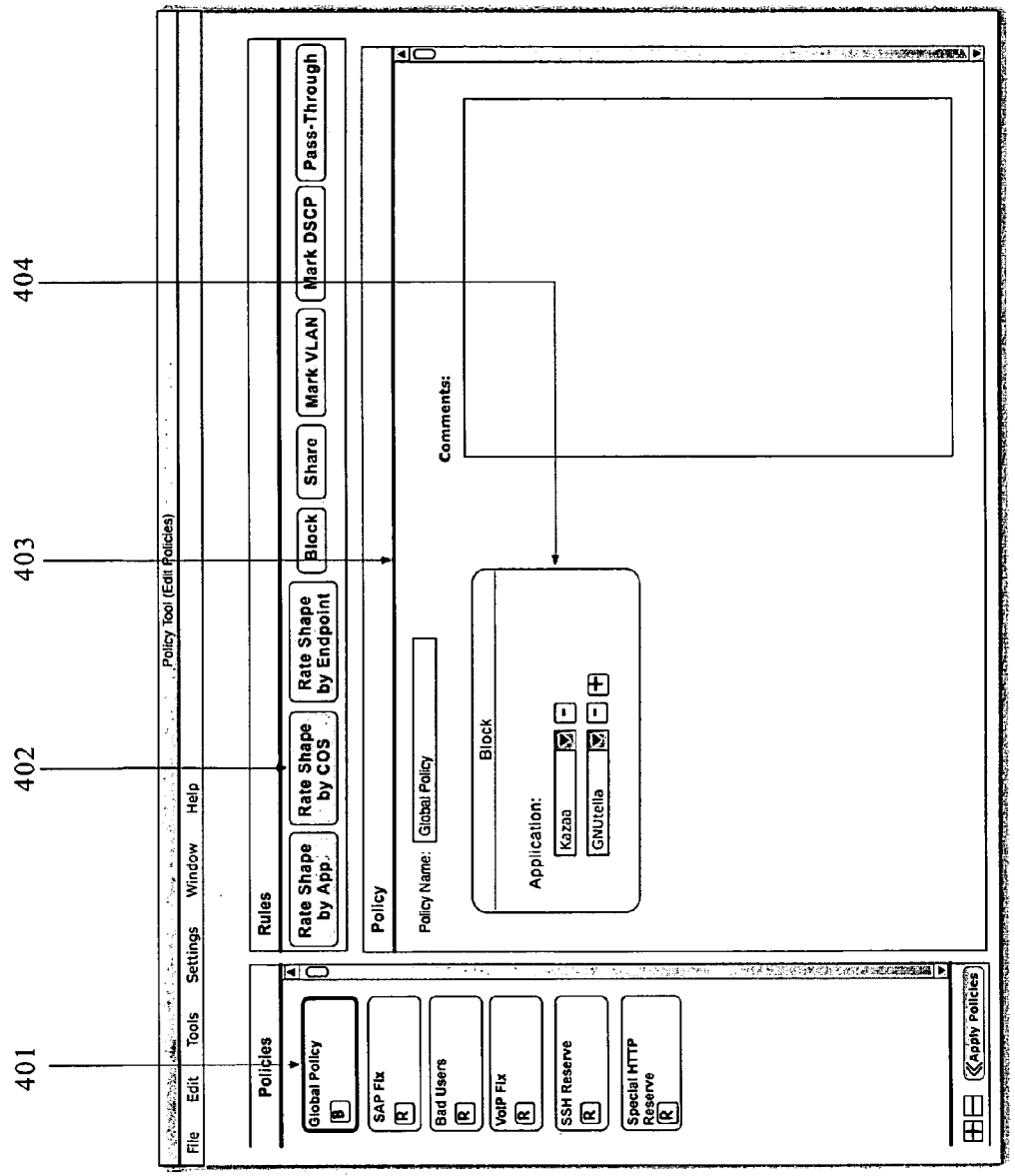
FIG. 4 is a diagram showing an example of a GUI component for editing a policy managing or shaping traffic over a WAN, which component might be part of an embodiment of the present invention.

FIG. 4 shows (via a hypothetical "screenshot") a GUI component which the present invention might display to a network manager using network policy configuration server 120. The GUI component illustrated in FIG. 4 facilitates the configuration of one or more policies. This component allows a network manager to establish a name for a particular policy in an area of the component, identified as the Policy and Configuration Area 403. The component also allows a network manager to add rules to that policy by dragging, e.g., with a mouse, associated rule templates from the area identified as 402 into the Policy and Configuration Area 403 and then dropping them there. FIG. 3 shows a panel area identified as 401, on the left side of the component, where completed and named policies are displayed, using abbreviations for a policy's rules, such as "B" for Block and "R" for Rate Shape. FIG. 4 also shows an area identified as 404, where the network manager might associate a rule in a policy with an application, such as the P2P application, GNUtella.

As noted above, area 402 of this GUI component contains rule templates for the formulation of policy. The template, Rate Shape by App, facilitates configuration of aggregate or per-flow bandwidth utilization controls (see below) on a per-application basis. The template, Rate Shape by COS, facilitates configuration of aggregate or per-flow bandwidth utilization controls on a Class of Service basis. The template, Rate shape by Endpoint, facilitates configuration of aggregate or per-flow bandwidth utilization controls on a per-endpoint basis. The template, Block, facilitates configuration of blocking or discard policies. The template, Shared, facilitates configuration of controls for the distribution of bandwidth between applications, in one implementation, using a weighted partition system which assigns a weight to each application. The template, Mark VLAN, facilitates configuration of policies where VLAN identifiers are added or modified. The template, Mark DSCP, facilitates configuration of policies operative to mark network traffic with DiffServ or other QoS (Quality of Service) markings (e.g., MPLS tags, etc.). The template, Pass-Through, facilitates configuration of controls that allow matching traffic to be sent on unimpeded with a policy and without measurement data recorded for the traffic.

An aggregate bandwidth utilization control operates to manage bandwidth for aggregate data flows associated with a traffic class. An aggregate bandwidth utilization control can be configured to essentially partition the available bandwidth corresponding to a given access or WAN link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition or partition configuration hierarchy can be created by configuring the partitions, arranging them as desired, and defining the rules or matching attributes of the partitions. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

Whereas aggregate bandwidth utilization controls (e.g., partitions, above) allow for control of aggregate data flows associated with a matching traffic class, per-flow bandwidth utilization controls allow for control of individual data flows. In one embodiment, different bandwidth utilization control types include, but are not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes traffic policy module 84 to discard or drop data packets or flows associated with a particular traffic class. Other policy types include redirection policies where an inbound request designating a particular resource, for example, is redirected to another server.

Endpoints

Such policies do not operate in a vacuum. Rather, when applied to one or more network devices, they define how such network devices manage or shape traffic between two endpoints. Endpoints define the origin or destination of network traffic.

Endpoints, in one embodiment, can each be one of a plurality of endpoint types. In one embodiment, endpoints types might comprise: WAN links, sites, site groups, and host groups. WAN links are physical network connections that connect a site to the WAN. In one implementation, sites are defined by an IP (Internet Protocol) address range and a name that represents a physical location. Sites might or might not have their WAN links managed by a device such as 108, 109, 110, and 111. A site group is a collection of sites, as its name implies; several special site groups are described below. Further, a site can represent a group of hosts interconnected by a network at a physical location. Host groups represent a subset of the hosts (e.g., a computer acting as server) at a site. In one embodiment, host groups are defined by individual IP address (es), a subnet IP range, and/or VLAN (virtual local area network) ID.

Some special site groups are "Any Traffic", "WAN IP Space", and "Internet", in one embodiment. The network manager specifies IP address ranges to define two of these site groups, Internet and WAN IP Space. WAN IP Space defines the IP address range corresponding to the managed sites. Internet is an endpoint type corresponding to traffic originated from or destined to hosts reachable across Internet 107. "Any Traffic" is any traffic origin or destination.

Figure 5:
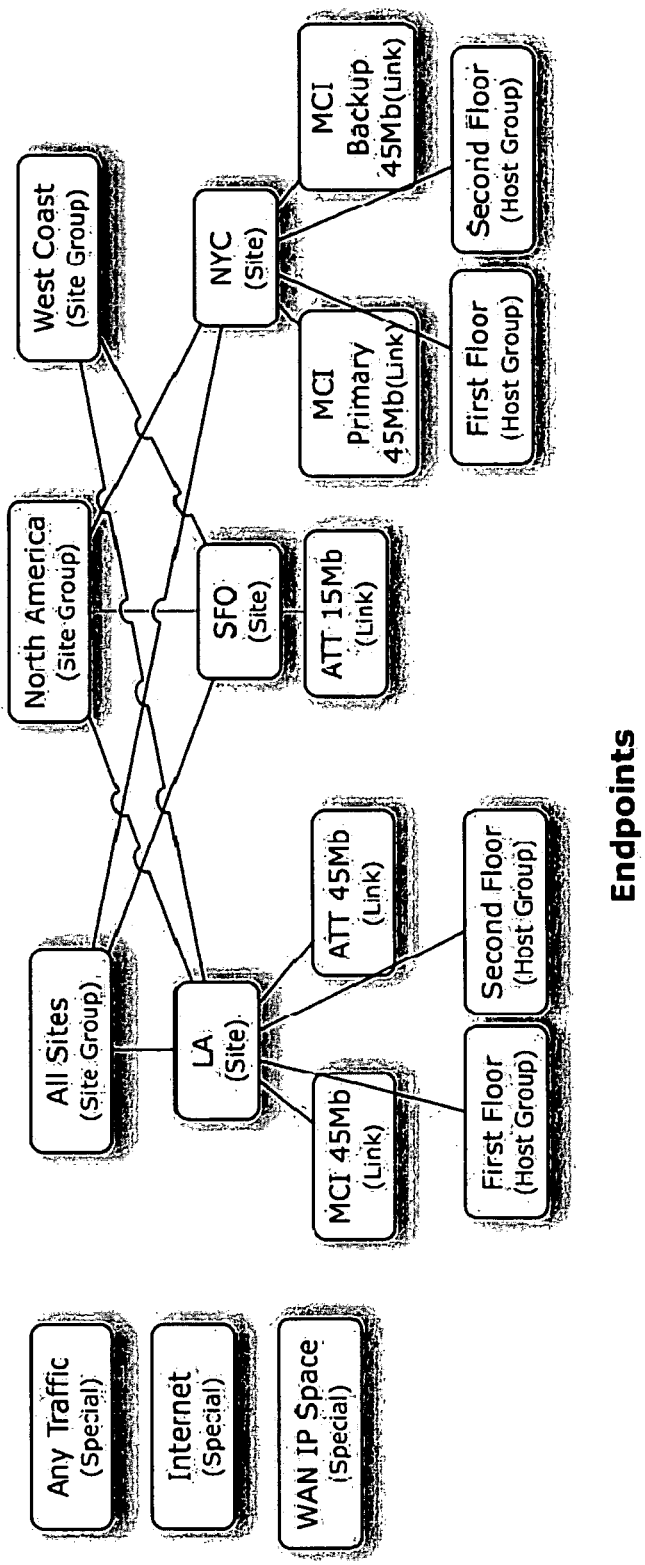
FIG. 5 is a diagram showing several examples of a possible endpoint in a network, which endpoint might be used by an embodiment of the present invention.

FIG. 5 is shows several examples of possible endpoints, and the configured relationships between endpoint types, in a network such as the one shown in FIG. 1. As shown in FIG. 5, an endpoint might be an actual physical endpoint such as a network link or an endpoint might be a logical endpoint, such as a host group. Or an endpoint might be a collection of such physical and/or logical endpoints; it is still called an endpoint. But ultimately, in one embodiment, all endpoints are based on physical and/or logical connections to a network.

Figure 7:
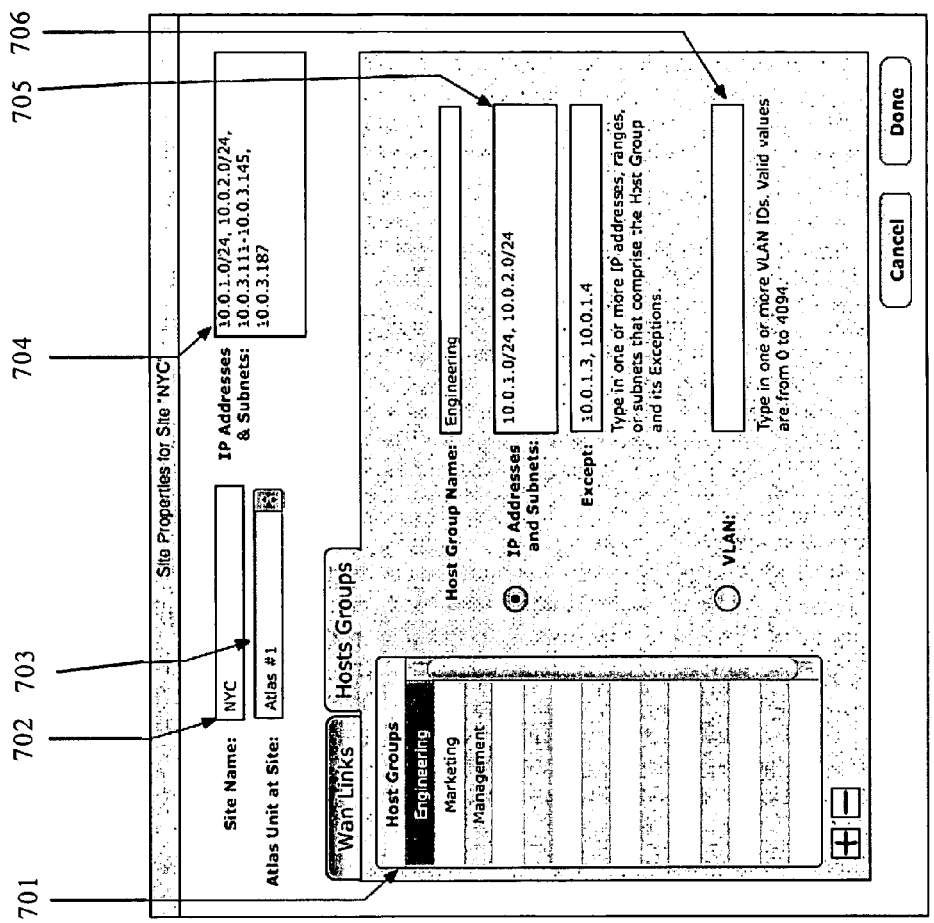
FIG. 7 is a diagram showing an example of a GUI component for creating host groups within a logical site, which component might be a part of an embodiment of the present invention.

FIGS. 6 and 7 show a tabbed GUI component which an embodiment of the present invention might display to a network manager using a network policy configuration application. This tabbed component allows a network administrator to associate to a given site one or more network devices deployed at, or corresponding to, that site. The non-tabbed area of this GUI component is the same in both FIGS. 6 and 7 and displays the site name (603 and 702), the IP addresses and subnets at that site (606 and 704), and the version of the graphical configuration interface (604 and 703) at that site.

In FIG. 6, the selected tab is entitled "WAN Links" and with this tab selected, the GUI component would allow a network manager to target policies at a WAN link within a site. As shown in the figure, the elements of a WAN link might comprise its name 601, its link speed 602, its SLA (Service Level Agreement) 603, and its NIC (Network Interface Card) Pair or Pairs 604.

In FIG. 7, the selected tab is entitled "Host Groups" and with this tab selected the GUI component would allow a network manager to target policies at a host group, i.e., a group of hosts within a site. As shown in this figure, the elements of a host group might comprise its name 701, the IP addresses and subnets that comprise the host group 705, as opposed to the site, and the host group's VLAN identifiers 706. In an alternate embodiment, a WAN link is defined as a set of IP addresses that is a subset of the IP addresses of the site at which the WAN link is defined. As the tabbed component in FIG. 7 illustrates, a host group, in one embodiment, can be defined relative to IP addresses or subnets, and/or VLAN identifiers.

Applied Policies

In one embodiment, an applied policy comprises the selection and arrangement of two endpoints, a traffic direction indicator, and a policy. A traffic direction indicator, in one embodiment, is an arrow pointing either right or left, or both right and left. As its name implies, a traffic direction indicator indicates the direction or flow of traffic from a source to a destination, and in connection with an applied policy defines the direction of traffic to which a given policy has applicability. When the flow of traffic is bi-directional, the appropriate traffic direction indicator is one with both right and left arrows.

Figure 8:
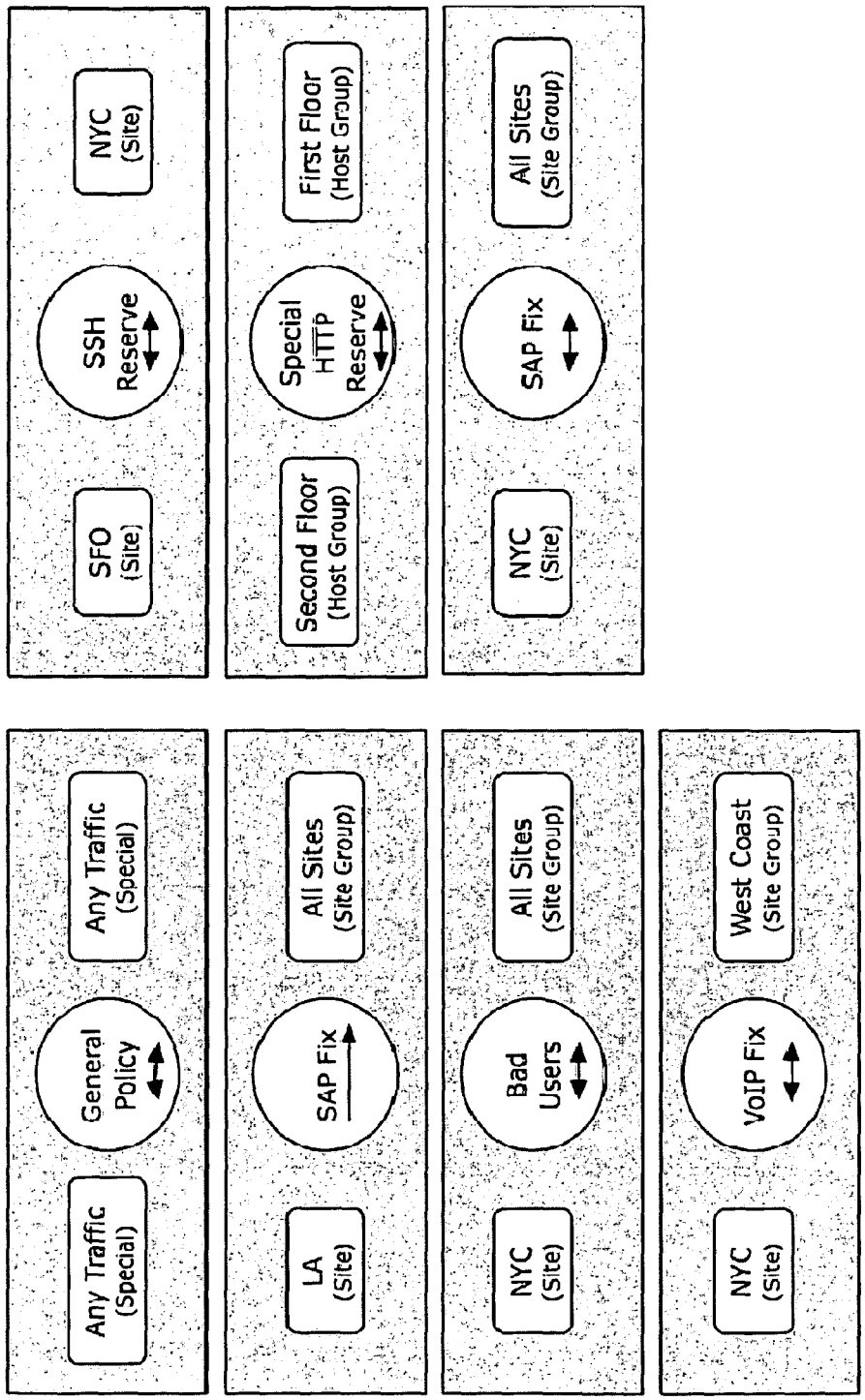
FIG. 8 is a diagram showing several examples of an applied policy, which examples might relate to an embodiment of the present invention.

FIG. 8 shows several examples of applied policies which a network manager might use when accessing a network policy configuration application. The first example shows a policy called General Policy which is applied to two endpoints which happen to be the same endpoint, namely, "Any Traffic". The other applied policies in FIG. 8 have endpoints which differ from each other.

Figure 9:
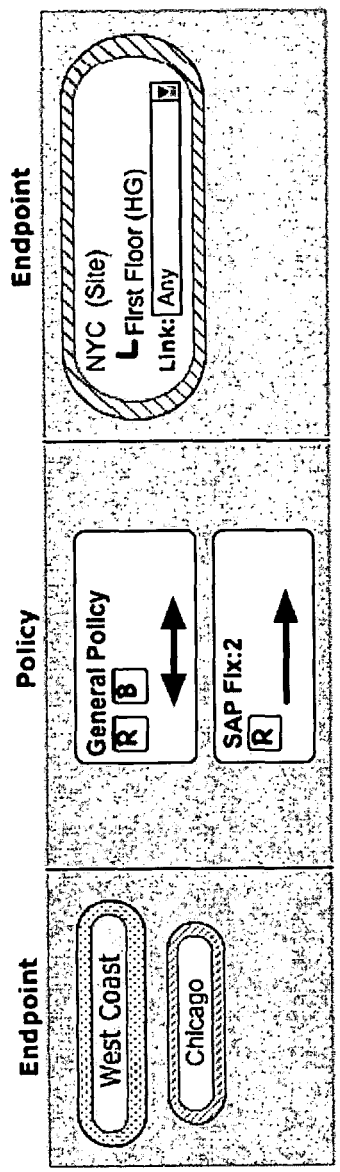
FIG. 9 is a diagram showing an example of a GUI component for creating an applied policy, which component might be a part of an embodiment of the present invention.

FIG. 9 shows a GUI component which the present invention might display to a network manager using a network policy configuration application. The component allows the network manager to create a composite applied policy, from two or more individual policy objects. As shown in FIG. 9, the composite's individual policy objects need not have the same traffic direction indicator, though they must have the same endpoints. However, each of these endpoints might itself be a collection of two or more physical and/or logical endpoints. In FIG. 9, the endpoint on the left is such a collection.

Endpoint View

Figure 10:
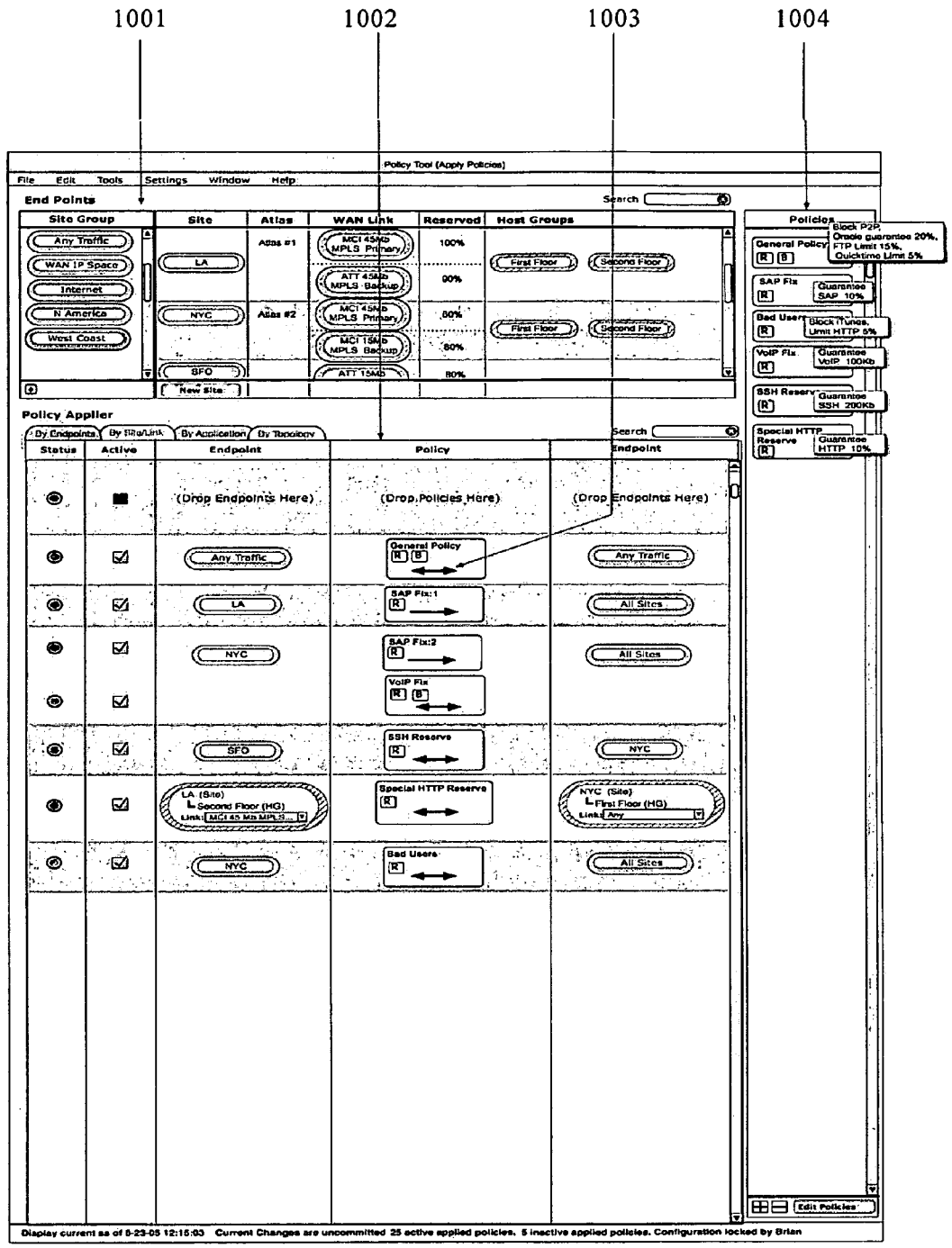
FIG. 10 is diagram showing an example of a GUI view displaying several applied policies, which view might be a part of an embodiment of the present invention.

FIG. 10 shows a tabbed GUI interface, with the selected tab entitled "By Endpoints". When this tab is selected, this GUI interface is called an Endpoint View and displays the applied policies which might be created by a network manager according to one possible embodiment. The tabbed area of the Endpoint View is called the Policy Application Area, identified as 1002, and it displays a table structure consisting of an endpoint column, followed by a policy column, followed by another endpoint column. Each row represents the application of one or more policies, i.e., an applied policy or applied policies (with traffic direction shown by a traffic direction indicator such as 1003).

In a non-tabbed area, identified as 1001, above the Policy Application Area, this GUI interface displays one or more configured endpoints. In another non-tabbed area, identified as 1004, to the right of the Policy Application Area, this GUI interface displays one or more policies which a network manager has thus far created. Further, this GUI interface allows the network manager to edit and update these policies and to add new policies, through the GUI component shown in FIG. 4.

In a manner similar to that described earlier for the Policy and Configuration Area 403, a network manager might use an input device, such as a mouse, to drag and drop endpoints and policies into the Policy Application Area 1001 of this GUI view and thereby easily create applied policies. In addition, the GUI may also include a column allowing a network administrator to selectively activate or de-activate a policy application.

As FIG. 10 illustrates, embodiments of the present invention provide for an intuitive network policy configuration tool. In the illustrated embodiment, a network administrator may configure a policy application by selecting endpoints and placing them in the endpoint columns of a given policy application row, and then selecting one or more policy objects and placing them in the policy column of the policy application row.

Site Link View and Application View

Figure 11:
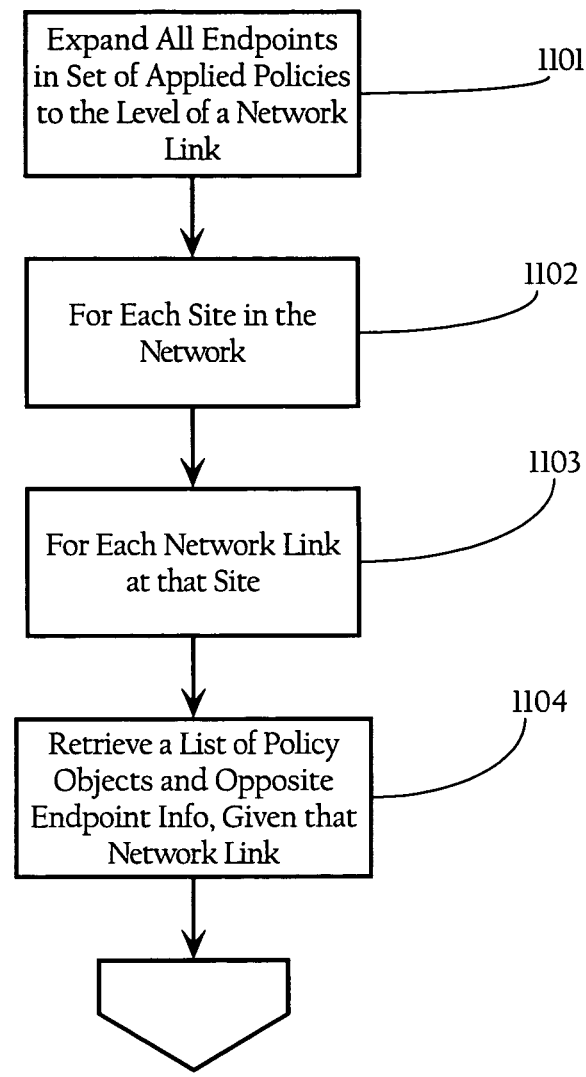
FIG. 11 is a diagram showing a flowchart of a process for generating data describing the applied policies at the links of one or more network sites, which process might relate to an embodiment of the present invention.
Figure 12:
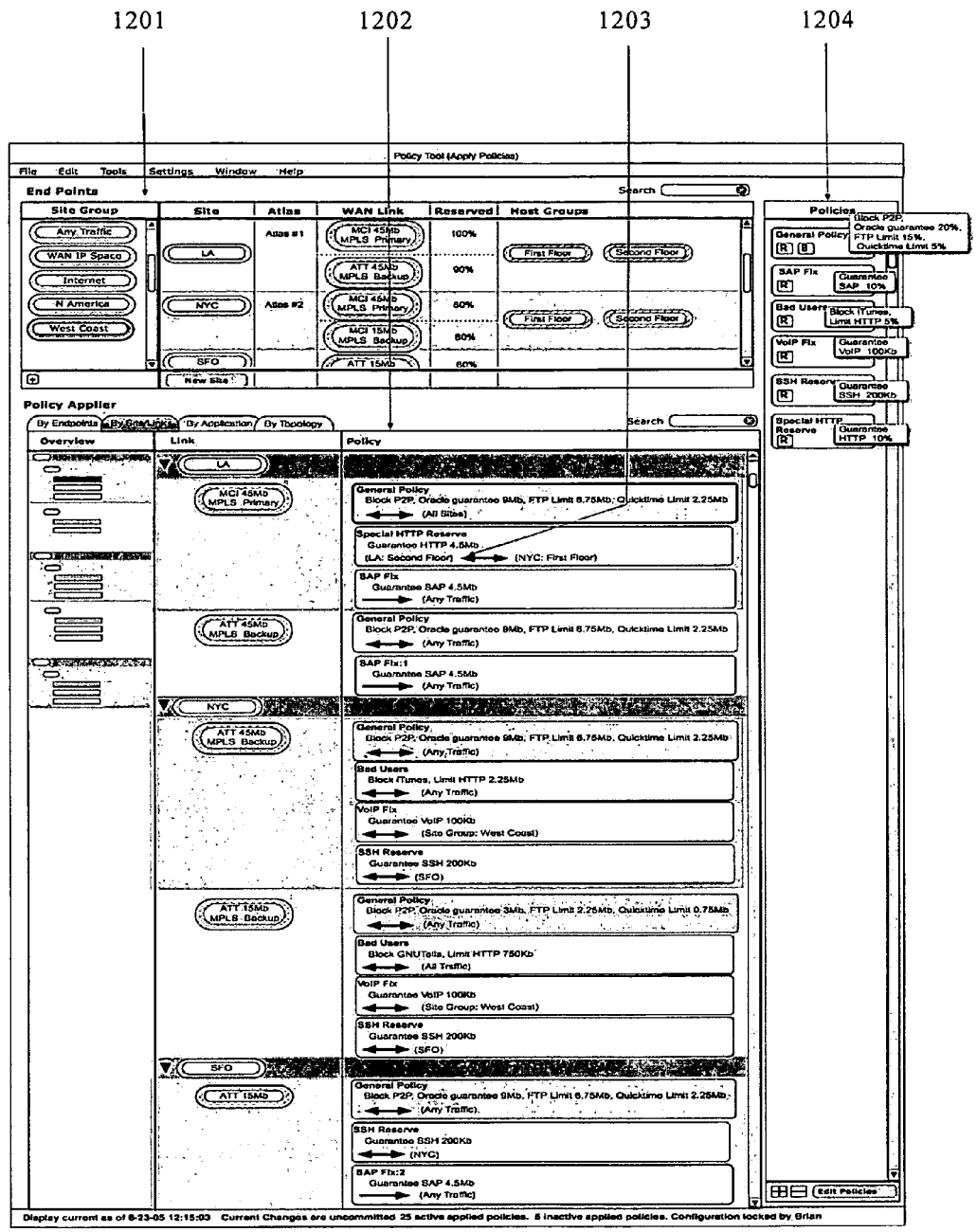
FIG. 12 is diagram showing an example of a GUI view displaying the applied policies at one or more network sites, which view might be a part of an embodiment of the present invention.

FIG. 11 shows a flowchart for a process, in one embodiment, for generating data describing all the network sites or links which are part of applied policies. The first step in the process, identified as 1101, expands all endpoints in the set of applied policies into the network links to which the endpoints correspond. The next step, step 1102, creates an iteration over each site in the set of applied policies. Step 1103 creates an iteration over each network link in a given site. Then step 1104 retrieves a list of policy objects and opposite-endpoint information, based on a given network link. The data resulting from this process is displayed in the tabbed GUI interface, called the Site Link View, shown in FIG. 12.

This tabbed GUI interface differs from the Endpoint View only with respect to its tabbed area 1202, which is entitled "By Site/Link". In this tabbed area, the Site Link View shows all of the network manager's applied policies, broken out by network link. Items 1201, 1203, and 1204, correspond to items 1001, 1003, and 1004, respectively.

Figure 13:
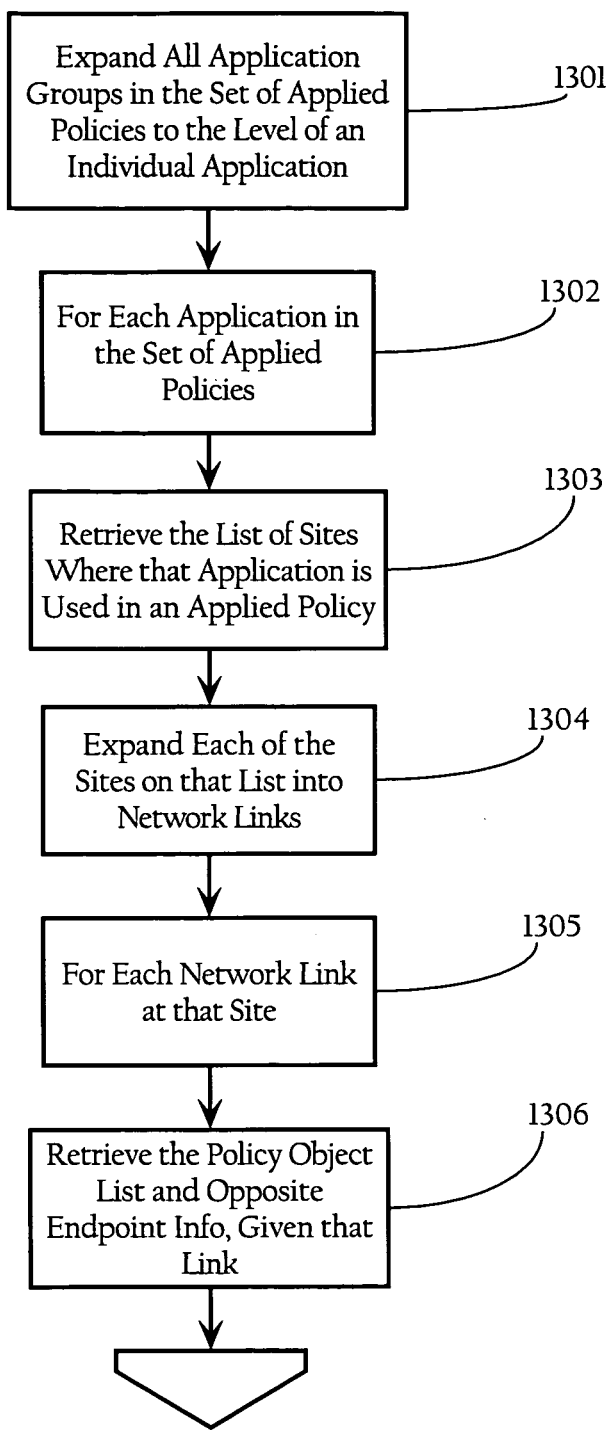
FIG. 13 is a diagram showing a flowchart of a process for generating data describing the applied policies at one or more network sites for one or more applications, which process might relate to an embodiment of the present invention.
Figure 14:
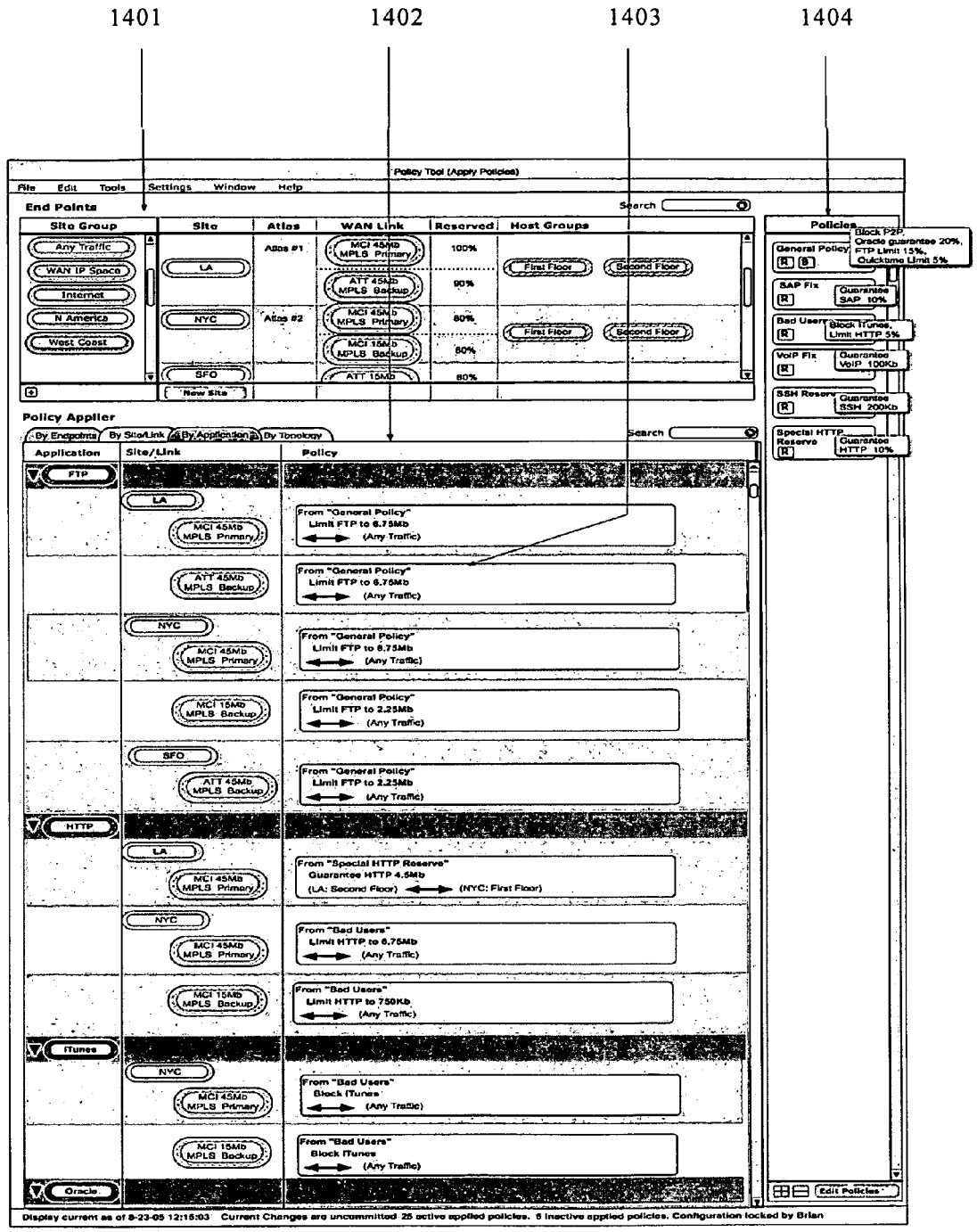
FIG. 14 is diagram showing an example of a GUI view displaying the policies in force at one or more network sites for one or more applications, which view might be a part of an embodiment of the present invention.

Similarly, FIG. 13 shows a flowchart for a process, in one embodiment, for generating data describing all applications which are affected by applied policies. The first step in the process, identified as 1301, expands all application groups into the individual applications into which the groups correspond. The next step, step 1302, creates an iteration over each application in the set of applied policies. Further, step 1303 retrieves a list of sites where a given application is used. And step 1304 expands each of those sites into its corresponding network links. Step 1305 creates an iteration over each network link in a given site. Then step 1306 retrieves a policy object list and opposite-endpoint information, based on a given application and a given network link. The data resulting from this process is displayed in the tabbed GUI interface, called the Application View, shown in FIG. 14.

This tabbed GUI interface differs from the Endpoint View and the Site Link View only with respect to its tabbed area 1402, which is entitled "By Application". In this tabbed area, the Application View shows all of the network manager's applied policies (with traffic direction shown by a traffic direction indicator such as 1403), broken out by application as well as by site or network link. Items 1401, 1403, and 1404, correspond to items 1201, 1203, and 1204, respectively.

Thus, the Site Link View and the Application View provide perspectives of applied policies which differ from the perspective shown in the Endpoint View. These different perspectives are useful for to network managers trying to understand which applied policies are in effect at a particular site or which applied policies affect a particular application.

Physically Deploying the Logically Applied Policies

In the preceding description of this embodiment, applied policies are logical constructs, which operate on logical endpoints in a data model. However, each logical endpoint corresponds to one or more physical connections in a network, where one or more network policy devices are deployed, and consequently might be expanded into its physical connections.

Figure 15:
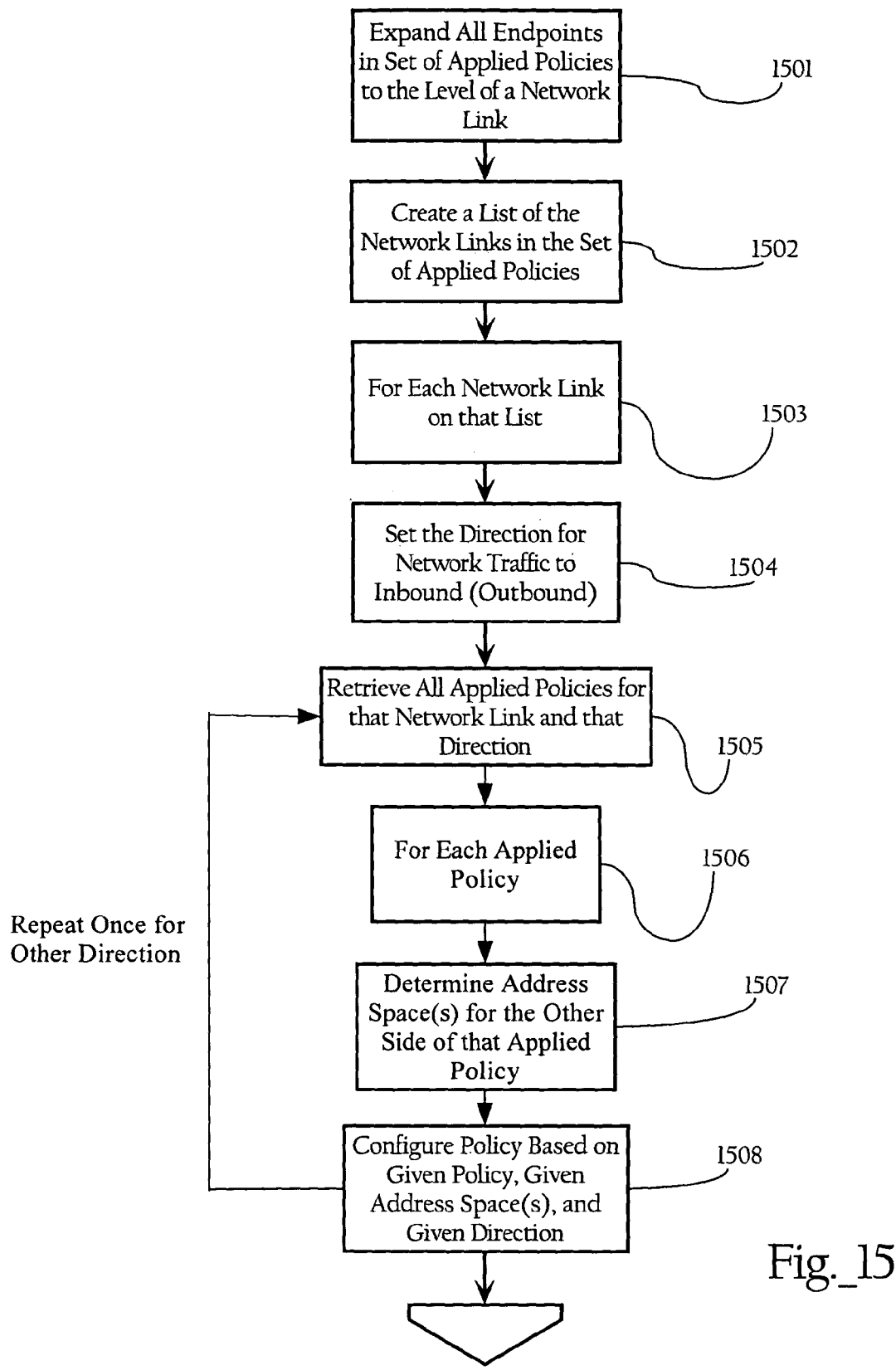
FIG. 15 is a diagram showing a flowchart of a process for physically applying one or more logically applied policies in a network to a group of network policy devices, which process might relate to an embodiment of the present invention.

FIG. 15 shows a flowchart for a process, according to one implementation of the invention, for applying one or more of the logically-applied policies in a network to corresponding actual physical connections.

The first step in the process, identified as 1501, expands all endpoints in the set of applied policies into the network (e.g., WAN) links to which the endpoints correspond. The next step, step 1502, creates a list of the network links in the set of applied policies, e.g., a network link involved in at least one applied policy. Further, step 1503 creates an iteration over each network link on this list. Step 1504 sets a direction for network traffic, e.g., inbound or outbound, which corresponds to a traffic direction indicator. Then step 1505 retrieves all applied policies, given a network link and a direction. Step 1506 creates an iteration over each of these applied policies. Step 1507 determines an IP address space(s) for the other side of a given applied policy. Then 1508 configures policy based on (a) the policy object for a given applied policy, (b) a given address space, and (c) a given direction. To complete the process, the process must repeat steps 1504 through 1508 for the other direction.

The disclosures in the cross-reference applications, identified above, contain further details related to this process.

As discussed above, the present invention, in one embodiment, might be comprised of instructions that are stored on storage media. The instructions might be retrieved and executed by a processing system. The instructions are operational when executed by the processing system to direct the processing system to operate in accord with the present invention.

Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiment that fall within the scope of the invention. For example, although embodiments described above operate in connection with network application traffic management devices, implementations of the present invention can be used to apply policy to other network devices, such as gateways, proxies, firewalls, packet capture devices and the like. As a result, the invention is not limited to the specific examples and illustrations discussed above, but only by the following claims and their equivalents.

What is claimed is:

1. A method for facilitating configuration of policies deployed in a network, the method using a data processing system including a display and one or more input devices, the method comprising:
    displaying on the display a configuration interface comprising
    a first interface component including a set of endpoints for traffic in the network, the interface component being based on data relating to physical connections in the network, the data being entered or previously entered by a user,
    a second interface component including a set of policies, the interface component being based on data relating to policies entered or previously entered by a user, and
    a third interface component, responsive to user input, facilitating logical application of one or more policies from the set of policies to two or more endpoints from the set of endpoints, along with an indicator of traffic direction for each policy so applied;
    wherein the third interface component uses a table to display a logically applied policy, the table including a row for each logically applied policy and three columns in each row comprising,
    a first column for one or more endpoints for the logically applied policy,
    a second column for one or more policies for the logically applied policy, wherein each of the policies has a traffic direction indicator, and
    a third column for one or more endpoints for the logically applied policy
    updating the display of the third interface component in response to an input from the user which logically applies one or more policies from the set of policies to at least two endpoints from the set of endpoints, along with an indicator of traffic direction for each policy so applied, the indicator configured to indicate application of the policy to bidirectional and unidirectional traffic; and storing as policy application data a representation of the logically applied policies displayed in the third interface component.

2. The method of claim 1 further comprising:

displaying on the display a further interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface displaying any logically applied policy entered or previously entered by a user, the policy matched to one or more network links, possibly represented as one or more sites, for each of the policy's endpoints.

3. The method of claim 2 further comprising:

displaying on the display a further interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface displaying any logically applied policy entered or previously entered by a user, the policy matched to one or more network links, possibly represented as one or more sites, for each of the policy's endpoints and the policy also matched to an application referred to in the policy.

4. The method of claim 1 further comprising:

displaying on the display a further interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface displaying any logically applied policy entered or previously entered by a user, the policy matched to one or more network links, possibly represented as one or more sites, for each of the policy's endpoints and the policy also matched to an application referred to in the policy.

5. The method of claim 1 wherein the network is a computer network.

6. The method of claim 1 wherein the endpoints comprise WAN links, site groups, sites, host groups, and collections of the foregoing.

7. The method of claim 1 further comprising:

using the stored policy application data to establish or update a control governing a physical connection in the network.

8. A method for facilitating configuration of policies deployed in a network, the method using a data processing system including a display and one or more input devices, the method comprising:

displaying on the display a configuration interface comprising:

a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface component, responsive to user input, facilitating logical application of one or more policies from the set of policies to two or more endpoints from the set of endpoints, along with an indicator of traffic direction for each policy so applied, the indicator configured to indicate application of the policy to bidirectional and unidirectional traffic;

wherein the third interface component uses a table to display a logically applied policy, the table including a row for each logically applied policy and three columns in each row comprising:

a first column for one or more endpoints for the logically applied policy, a second column for one or more policies for the logically applied policy, wherein each of the policies has a traffic direction indicator, and a third column for one or more endpoints for the logically applied policy.

9. The method of claim 8 further comprising:

displaying on the display a further interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and third interface displaying any logically applied policy entered or previously entered by a user, the policy matched to one or more network links, possibly represented as one or more sites, for each of the policy's endpoints.

10. The method of claim 9 further comprising:

displaying on the display a further interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface displaying any logically applied policy entered or previously entered by a user, the policy matched to one or more network links, possibly represented as one or more sites, for each of the policy's endpoints and the policy also matched to an application referred to in the policy.

11. The method of claim 8 further comprising:

displaying on the display a further interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface displaying any logically applied policy entered or previously entered by a user, the policy matched to one or more network links, possibly represented as one or more sites, for each of the policy's endpoints and the policy also matched to an application referred to in the policy.

12. Logic encoded in one or more tangible media for execution on a data processing system, the logic when executed operable to:

display a configuration interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface component, responsive to user input, facilitating logical application of one or more policies from the set of policies to two or more endpoints from the set of endpoints, along with an indicator of traffic direction for each policy so applied, the indicator configured to indicate application of the policy to bidirectional and unidirectional traffic;

wherein the third interface component uses a table to display a logically applied policy, the table including a row for each logically applied policy and three columns in each row comprising, a first column for one or more endpoints for the logically applied policy, a second column for one or more policies for the logically applied policy, wherein each of the policies has a traffic direction indicator, and a third column for one or more endpoints for the logically applied policy;

update the display of the third interface component in response to an input from the user which logically applies one or more policies from the set of policies to at least two endpoints from the set of endpoints, along with an indicator of traffic direction for each policy so applied, the indicator configured to indicate application of the policy to bidirectional and unidirectional traffic; and store as policy application data a representation of the logically applied policies displayed in the third interface component.

13. The logic of claim 12, wherein the logic when executed is further operable to:

display a second interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface displaying any logically applied policy entered or previously entered by a user, the policy matched to one or more network links, possibly represented as one or more sites, for each of the policy's endpoints.

14. The logic of claim 13, wherein the logic when executed is further operable to:

display a third interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface displaying any logically applied policy entered or previously entered by a user, the policy matched to one or more network links, possibly represented as one or more sites, for each of the policy's endpoints and the policy also matched to an application referred to in the policy.

15. The logic of claim 12, wherein the logic when executed is further operable to:

display a second interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface displaying any logically applied policy entered or previously entered by a user, the policy matched to one or more network links, possibly represented as one or more sites, for each of the policy's endpoints and the policy also matched to an application referred to in the policy.

16. The logic of claim 12 wherein the network is a computer network.

17. The logic of claim 12 wherein the endpoints comprise WAN links, site groups, sites, host groups, and collections of the foregoing.

18. The logic of claim 12, wherein the logic when executed is further operable to: use the stored policy application data to establish or update a control governing a physical connection in the network.

19. An apparatus, comprising a data processing system including a display means and user input means, and further comprising:

means for displaying on the display means a configuration interface comprising a first interface component including a set of endpoints for traffic in the network, the interface component being based on data relating to physical connections in the network, the data being entered or previously entered by a user, a second interface component including a set of policies, the interface component being based on data relating to policies entered or previously entered by a user, and a third interface component, responsive to user input, facilitating logical application of one or more policies from the set of policies to two or more endpoints from the set of endpoints, along with an indicator of traffic direction for each policy so applied, the indicator configured to indicate application of the policy to bidirectional and unidirectional traffic;

wherein the third interface component uses a table to display a logically applied policy, the table including a row for each logically applied policy and three columns in each row comprising:

a first column for one or more endpoints for the logically applied policy,
a second column for one or more policies for the logically applied policy, wherein each of the policies has a traffic direction indicator, and
a third column for one or more endpoints for the logically applied policy;
means for updating the display of the third interface component in response to an input from the user which logically applies one or more policies from the set of policies to at least two endpoints from the set of endpoints, along with an indicator of traffic direction for each policy so applied, the indicator configured to indicate application of the policy to bidirectional and unidirectional traffic; and
means for storing as policy application data a representation of the logically applied policies displayed in the third interface component.

20. An apparatus comprising
a memory,
one or more processors;
one or more network interfaces;
and logic encoded in one or more tangible media for execution by the one or more processors, the logic when executed operable cause the one or more processors to:
cause the display of a configuration interface comprising
a first interface component including a set of endpoints for traffic in the network, the interface component being based on data relating to physical connections in the network, the data being entered or previously entered by a user,
a second interface component including a set of policies, the interface component being based on data relating to policies entered or previously entered by a user, and
a third interface component, responsive to user input, facilitating logical application of one or more policies from the set of policies to two or more endpoints from the set of endpoints, along with an indicator of traffic direction for each policy so applied, the indicator configured to indicate application of the policy to bidirectional and unidirectional traffic;
wherein the third interface component comprises a table to display a logically applied policy, the table including a row for each logically applied policy and three columns in each row comprising,
a first column for one or more endpoints for the logically applied policy,
a second column for one or more policies for the logically applied policy, wherein each of the policies has a traffic direction indicator, and
a third column for one or more endpoints for the logically applied policy;
update the display of the third interface component in response to an input from the user which logically applies one or more policies from the set of policies to at least two endpoints from the set of endpoints, along with an indicator of traffic direction for each policy so applied, the indicator configured to indicate application of the policy to bidirectional and unidirectional traffic; and
store as policy application data a representation of the logically applied policies displayed in the third interface component.

21. The apparatus of claim 20, wherein the logic when executed is further operable to:
cause the display of a second interface comprising
a first interface component including a set of endpoints for traffic in the network, the interface component being based on data relating to physical connections in the network, the data being entered or previously entered by a user,
a second interface component including a set of policies, the interface component being based on data relating to policies entered or previously entered by a user, and
a third interface displaying any logically applied policy entered or previously entered by a user, the policy matched to one or more network links, possibly represented as one or more sites, for each of the policy's endpoints.

22. The apparatus of claim 21, wherein the logic when executed is further operable to:
cause the display of a third interface comprising
a first interface component including a set of endpoints for traffic in the network, the interface component being based on data relating to physical connections in the network, the data being entered or previously entered by a user,
a second interface component including a set of policies, the interface component being based on data relating to policies entered or previously entered by a user, and
a third interface displaying any logically applied policy entered or previously entered by a user, the policy matched to one or more network links, possibly represented as one or more sites, for each of the policy's endpoints and the policy also matched to an application referred to in the policy.

23. The apparatus of claim 20, wherein the logic when executed is further operable to:
cause the display of a second interface comprising
a first interface component including a set of endpoints for traffic in the network, the interface component being based on data relating to physical connections in the network, the data being entered or previously entered by a user,
a second interface component including a set of policies, the interface component being based on data relating to policies entered or previously entered by a user, and
a third interface displaying any logically applied policy entered or previously entered by a user, the policy matched to one or more network links, possibly represented as one or more sites, for each of the policy's endpoints and the policy also matched to an application referred to in the policy.

24. The apparatus of claim 20 wherein the network is a computer network.

25. The apparatus of claim 20 wherein the endpoints comprise WAN links, site groups, sites, host groups, and collections of the foregoing.

26. The apparatus of claim 20, wherein the logic when executed is further operable to:
use the stored policy application data to establish or update a control governing a physical connection in the network.

* * * * *